(12) United States Patent
Bicknell (10) Patent No.: US 11,853,050 B2
(45) Date of Patent: Dec. 26, 2023

(54) MODIFYING AN ENVIRONMENT CONTROL SETTING TO FACILITATE AWARENESS OF A FAULT CONDITION

(71) Applicant: Trane International Inc., Davidson, NC (US)

(72) Inventor: Kirby N. Bicknell, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 17/560,941

(22) Filed: Dec. 23, 2021

(65) Prior Publication Data
US 2022/0113717 A1  Apr. 14, 2022

Related U.S. Application Data

(63) Continuation of application No. 16/181,647, filed on Nov. 6, 2018, now Pat. No. 11,221,615.

(51) Int. Cl.
*G05B 23/02* (2006.01)
*G06F 11/07* (2006.01)

(52) U.S. Cl.
CPC ........ *G05B 23/0272* (2013.01); *G06F 11/079* (2013.01); *G06F 11/0736* (2013.01); *G06F 11/0751* (2013.01)

(58) Field of Classification Search
CPC ............ G05B 23/0272; G05B 23/0291; G06F 11/0736; G06F 11/0751; G06F 11/079
See application file for complete search history.

(56) References Cited

U.S. PATENT DOCUMENTS

| | | | |
|---|---|---|---|
| 6,851,621 B1 | 2/2005 | Wacker et al. |
| 9,989,960 B2 | 6/2018 | Wacker |
| 9,996,091 B2 | 6/2018 | Wells |
| 2006/0247826 A1 | 11/2006 | Green et al. |
| 2007/0138307 A1 | 6/2007 | Khoo |
| 2010/0044449 A1 | 2/2010 | Tessier |
| 2012/0031984 A1 | 2/2012 | Feldmeier et al. |
| 2013/0048263 A1 | 2/2013 | Nouvel et al. |
| 2015/0127170 A1 | 5/2015 | Quam et al. |
| 2015/0127171 A1 | 5/2015 | Quam et al. |
| 2015/0127172 A1 | 5/2015 | Quam et al. |

(Continued)

FOREIGN PATENT DOCUMENTS

| | | |
|---|---|---|
| EP | 2146153 A2 | 1/2010 |
| WO | 2016123536 A1 | 8/2016 |
| WO | 2017207634 A1 | 12/2017 |

*Primary Examiner* — Tejal Gami
(74) *Attorney, Agent, or Firm* — WOMBLE BOND DICKINSON (US) LLP (57) ABSTRACT

Architectures or techniques are presented that can determine a setting for an environment control (EC) or HVAC system in response to a fault with the EC system that controls an environment of an occupant. Significantly, the determined setting can be intentionally selected as one that does not comport with the expectations or desired comfort level of the occupant. Thus, a condition can be created in the environment that is determined to be likely to cause the occupant to examine a user interface associated with the EC system. The user interface can present an indication of the fault, which otherwise may go unnoticed, particularly in cases where the occupant has no reason to interact with the EC system due to the environment meeting expectations.

20 Claims, 8 Drawing Sheets

(56) References Cited

U.S. PATENT DOCUMENTS

| | | |
|---|---|---|
| 2015/0211779 A1 | 7/2015 | Brandt et al. |
| 2017/0205098 A1* | 7/2017 | Wacker .................. G05B 15/02 |
| 2017/0234562 A1 | 8/2017 | Ribbich et al. |
| 2018/0266718 A1 | 9/2018 | Gillette et al. |
| 2019/0024920 A1* | 1/2019 | Delgoshaei .............. F24F 11/30 |

* cited by examiner

MODIFYING AN ENVIRONMENT CONTROL SETTING TO FACILITATE AWARENESS OF A FAULT CONDITION

CROSS-REFERENCE TO RELATED APPLICATIONS

This application is a continuation of U.S. patent application Ser. No. 16/181,647, filed Nov. 6, 2018, entitled Modifying an Environment Control Setting to Facilitate Awareness of a Fault Condition, the content of which is hereby incorporated by reference.

TECHNICAL FIELD

The present disclosure is directed to systems, apparatuses, and methods for modifying an environment control (e.g., HVAC) system setting to trigger awareness of a fault condition and/or producing a condition in an environment that prompts remedial action by an occupant.

BACKGROUND

Heating, ventilation, and air conditioning (HVAC) equipment can sometimes continue operation despite a component failure or a fault condition. However, continued operation can often lead to further damage to the equipment or to a more severe failure or fault condition. Such can result in a significantly more expensive repair or service cost as well as to significantly increased utility bills.

One solution to the aforementioned issue is to disable operation of the equipment until the equipment is serviced. Such significantly reduces the likelihood of further damage to the equipment, but at the cost of considerable customer dissatisfaction. It was found that HVAC equipment customers became dissatisfied when repair costs were increased by continued operation, but also dissatisfied by having no heating or cooling at all in the interim.

Thus, a better solution was introduced to operate as a compromise between these two competing objectives. Modern HVAC equipment is typically designed to reduce potential damage by reducing operation, rather than disabling operation. Hence, further damage to the equipment can be mitigated without depriving the customer of some minimal level of service. Additionally, some HVAC systems are designed with backup equipment that can be operated instead of, or in conjunction with, the primary equipment. For instance, the backup equipment can be cycled on to compensate for the reduced capacity of the primary equipment. In some instances, the backup equipment can fully substitute for the primary equipment, in which case the primary system can be disabled entirely. In either case, the primary equipment can be protected from additional damage stemming from use, and a comfort level of the HVAC customer can be maintained (or closely approximated) prior to servicing the primary equipment.

While the above solution does provide advantages, additional issues have arisen in connection with implementing systems, which can lead to one or more technological problems. It is believed these additional issues or technological problems are heretofore unknown or unrecognized.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment of the present invention, a system can comprise a memory that stores computer executable components and a processor that executes computer executable components stored in the memory. The computer executable components can comprise a diagnostic component that can determine an environment control (EC) system has a fault condition. The computer executable components can comprise an attention component that can determine a discomfort setting for the EC system. The discomfort setting can be one that, when effected in an environment controlled by the EC system, is determined to cause discomfort to an occupant of the environment. The computer executable components can further comprise a setting component that instructs the EC system to maintain the discomfort setting. Such can result in a realization or awareness that something is amiss and/or prompt the occupant to inspect a user interface where EC system settings are displayed or updated, which can lead to knowledge of the fault condition.

In some embodiments, elements described in connection with the system can be embodied in different forms such as a computer-implemented method, a computer-readable medium, or another form.

DETAILED DESCRIPTION

Overview

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Figure 1:
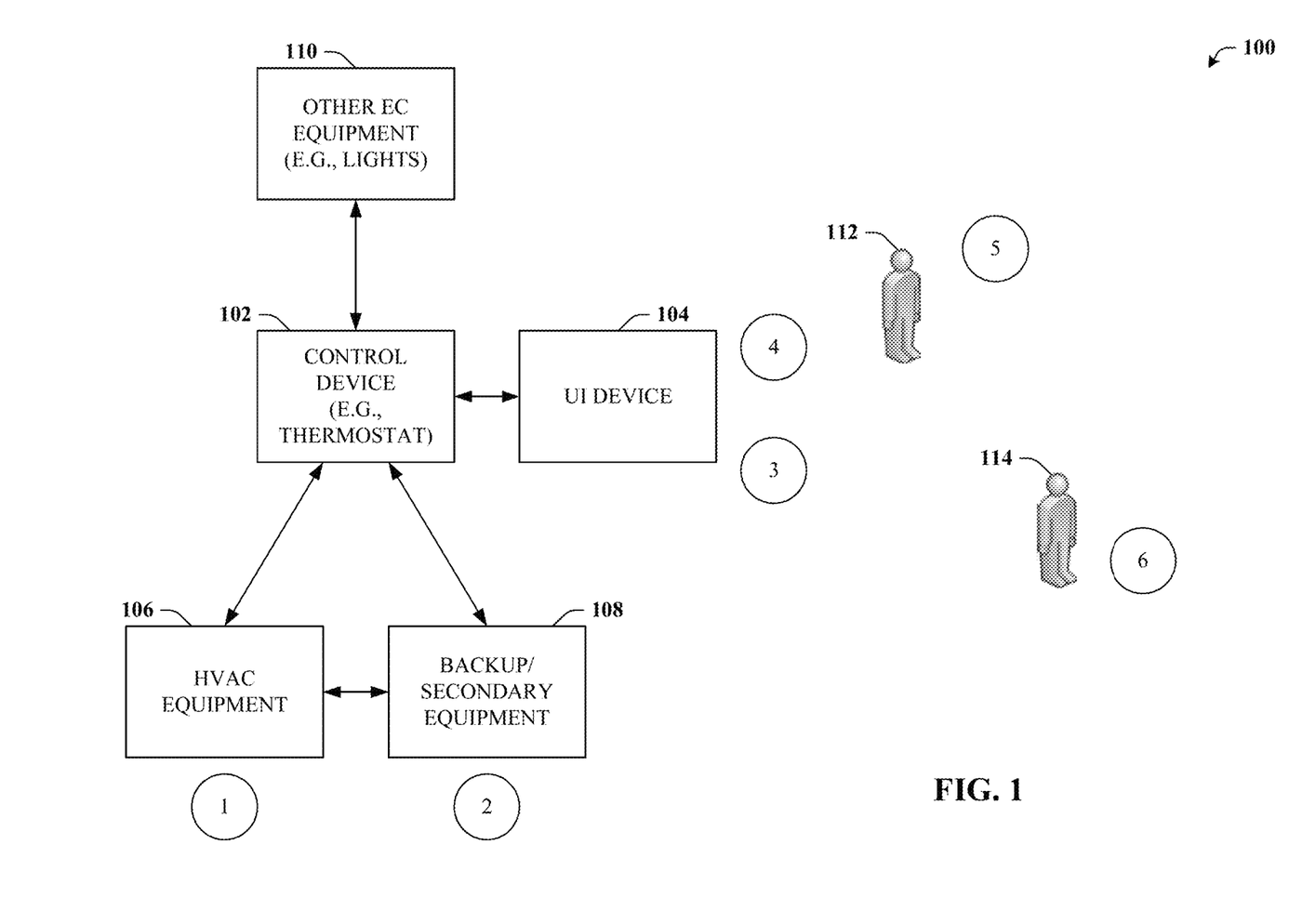
FIG. 1 illustrates a block diagram of a non-limiting environment control (EC) system 100 that can be configured to facilitate control of an environment that can be occupied by an occupant in accordance with one or more embodiments of the disclosed subject matter.

FIG. 1 illustrates a block diagram of a non-limiting environment control (EC) system 100. EC system 100 can be configured to facilitate control of an environment that can be occupied by occupant 112 in accordance with one or more embodiments of the disclosed subject matter. In some embodiments, EC system 100 can be, or can comprise a heating, ventilation, and air condition (HVAC) system or suitable components thereof. EC system 100 can comprise control device 102 such as a thermostat or other environment control device and user interface (UI) device 104 that can be utilized (e.g., by occupant 112) to provide inputs to or otherwise interact with control device 102. Control device 102 can communicate with and/or control other elements of the EC system 100, potentially in response to input to UI device 104. For example, control device 102 can control or communicate with HVAC equipment 106, backup equipment 108, or other environment control equipment 110.

HVAC equipment 106 can be any suitable device or component such as a heat pump, furnace, heater, air conditioner, or the like. In some embodiments, HVAC equipment 106 can include an outdoor portion (e.g., compressor) and an indoor portion (e.g., air handler). For the remainder of this disclosure, a heat pump example is used in connection with operations to heat the air of the environment, but it is appreciated that techniques detailed herein can apply to other equipment type implementations and situations. For example, the disclosed techniques can be applied in connection with systems for heating or cooling an environment and can be implemented with any suitable type of HVAC equipment.

Backup equipment 108 can include, e.g., backup electrical resistive heating equipment, backup gas furnace or the like. Typically, backup equipment 108 is used in cases where HVAC equipment 106 (e.g., the primary equipment) is not able to achieve a desired comfort setting. For instance, in cases in which the weather is extremely cold or HVAC equipment 106 has a failure or fault condition, backup equipment 108 can be employed to supplement or replace the operation of HVAC equipment 106. While many EC systems (e.g., EC system 100) are designed or implemented with backup equipment 108, the existence of backup equipment 108 can be optional. That is, certain embodiments of the disclosed subject matter can be useful for systems that include backup equipment 106 as well as systems that do not.

FIG. 1 further illustrates a series of events, labeled 1-6, that are intended to demonstrate issues or problems that can arise in connection with an EC or HVAC system. For example, consider event 1, in which a failure or fault condition for HVAC equipment 106 is detected. As an example, suppose that self-diagnostic sensors of HVAC equipment 106 detects a problem. To prevent further damage to HVAC equipment 106, the self-diagnostics element or control device 102 may instruct the compressor to shut down or enter a reduced capacity mode.

Reduced capacity mode can reduce the likelihood that HVAC equipment 106 sustains damage from operation. For simple 24 volt switched control devices, typically single speed systems, HVAC equipment 106 can be instructed to cycle on less frequently than might be called for to meet a set point input to control device 102, resulting in a reduced duty cycle and/or limited time of operation. For a digital control system, which is typically a variable speed system, control device 102 might instruct HVAC equipment 106 to operate at reduced speed during operation. In either case, potential damage to HVAC equipment 106 can be reduced, which is a beneficial result. In some embodiments, the decision to shut down the compressor or to enter reduced capacity mode may depend on the existence or capacity of backup equipment 108 as well as other factors such as weather conditions, occupant thermal demands, or the like.

At event 2, backup equipment 108, if present, can be switched on to compensate for the reduced capacity of HVAC equipment 106. A benefit that can be achieved is that the thermal demands (e.g., a set point input to UI device 104) of occupant 112 can be met or very closely approximated, even while HVAC equipment 106 is suffering from a fault condition, yet without unduly exposing HVAC equipment 106 to additional damage potential. Such has heretofore been deemed an advantage in previous systems but can result in several problems or deficiencies.

For example, at event 3, UI device 104 can be instructed to present an indication of the fault condition that occurred at event 1. For instance, UI device 104 might display an error code or explanation of the fault condition. However, because the thermal demands input to UI device 104 are currently being met, occupant 112 has no reason to suspect there is anything wrong with EC system 100. Hence, at event 4, occupant 112 fails to notice the fault condition indication as there is no clear reason to inspect UI device 104 or other sources of notice. Alternatively, even if occupant 112 happens to notice the indication, the indication might be ignored. In that case, it is possible that occupant 112 disregards the indication because the comfort level set by occupant 112 is being met, potentially implying to occupant 112 that EC system 100 is operating as expected despite some error indication.

At event 5, occupant 112 schedules service for HVAC equipment 106 and at event 6, a service technician 114 services HVAC equipment 106. However, it is noted that event 5 might occur an extended period of time after event 1, conceivably up to a month or more. Event 5 might be triggered, for example, by occupant 112 observing a utility bill that is much higher than expected, which might be weeks or months after event 1. This costly bill can be the result of operating backup equipment 108, which is not typically as efficient as HVAC equipment 106. For example, a common electrical resistive heating device operates at about one third the efficiency of a heat pump compressor. Thus, while operating backup system 108 can facilitate a designated level of comfort for occupant 112, such can lead to significantly higher costs.

In fact, meeting the designated level of comfort set by occupant 112 in the interim (e.g., between event 1 and event 5) can be a significant contributor to the lack of awareness of a problem existing with EC system 100 at all. Since a designated level of comfort is being maintained (or closely approximated) by EC system 100, there might be no reason to inspect UI device 104 or otherwise learn of the fault condition.

It is observed that these issues or other issues can arise even in systems without backup equipment 108. For example, fully or closely meeting the thermal demands set by occupant 112 might be accomplished by HVAC equipment 106 alone operating in reduced capacity mode. The nature of the fault condition might be such that HVAC equipment 106 operates less efficiently (e.g., resulting in higher-than-expected monthly bills) or might ultimately still result in further damage and higher service costs if operated for an extended time after event 1. Hence, while many examples detailed herein discuss systems with backup equipment 108, the disclosed subject matter can provide a technological improvement for other systems as well, including systems that do not include backup equipment 108.

The disclosed subject matter, in some embodiments, leverages the observation that, after a fault condition is detected, by continuing operation of HVAC equipment 106 and/or backup equipment 108 in a manner that satisfies expectations or designated comfort levels tends to promote a lack of awareness of the fault condition. Additionally, or alternatively, such might promote doubt as to the veracity or seriousness of the fault condition, even if occupant 112 becomes aware of the fault condition. The latter issue can arise in conjunction with either occupant 112 or service technician 114. For example, the error code or other indication of the fault condition might be cleared by resetting or rebooting control device 102. Thereafter, EC system 100 may begin operating in a manner that appears nominal, leading parties to mistakenly conclude the fault condition is remedied. Subsequently, the fault condition indicator can reappear, prompting another service call and potentially a more dissatisfied occupant 112. Thus, in addition to improving fault condition awareness, the disclosed techniques can also be employed to improve the diligence of service technician 114.

Example Systems

Figure 2:
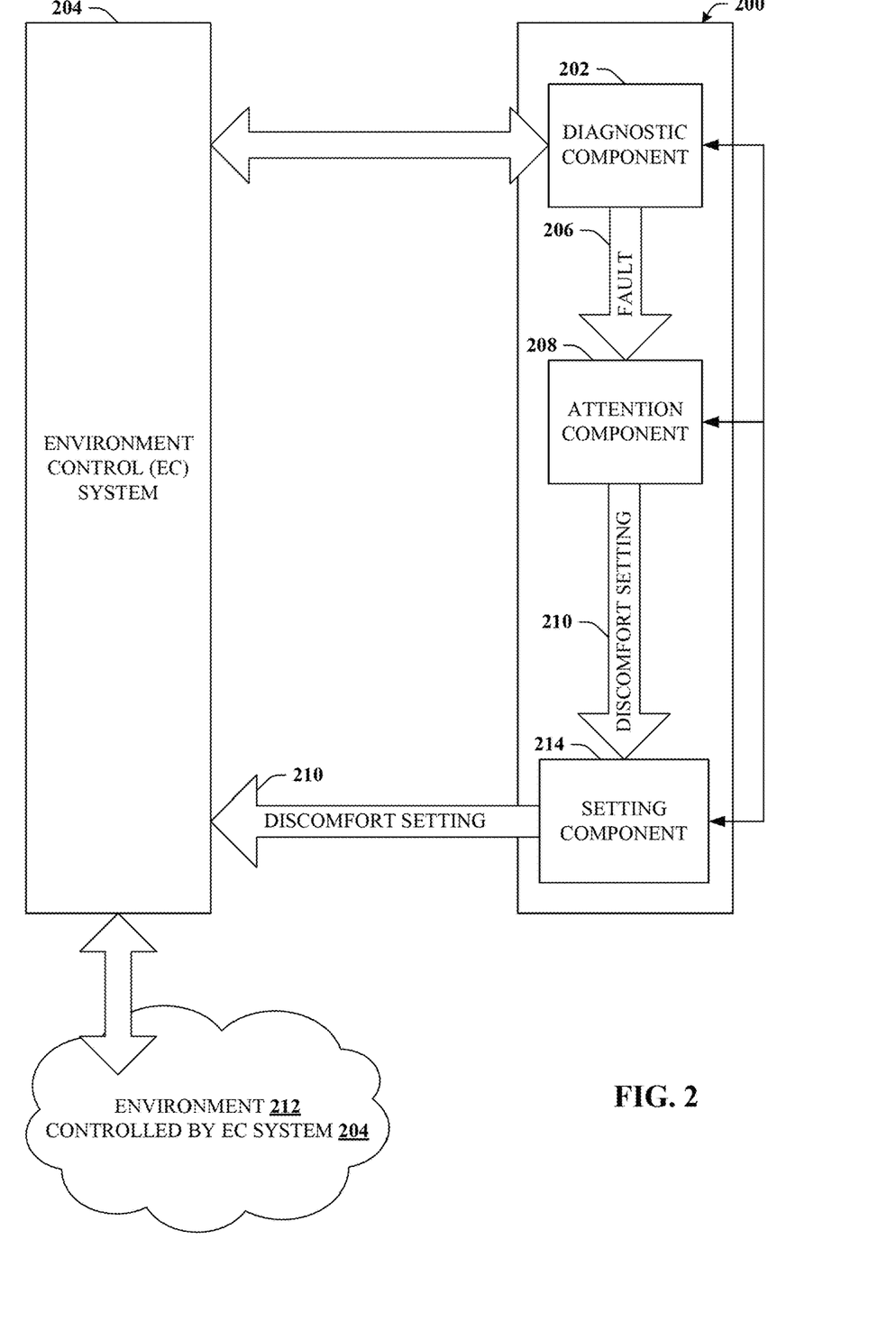
FIG. 2 illustrates a block diagram of an example, non-limiting system that can improve awareness of a fault condition in accordance with one or more embodiments of the disclosed subject matter.

Referring now to FIG. 2, a block diagram is depicted of an example, non-limiting system 200 that can improve awareness of a fault condition in accordance with one or more embodiments of the disclosed subject matter. It should be understood that in the discussion of the present embodiment and of embodiments to follow, repetitive description of like elements employed in the various embodiments described herein is omitted for sake of brevity. System 200 can comprise a processor and a memory that stores executable instructions that, when executed by the processor, facilitate performance of operations. Examples of said processor and memory, as well as other suitable computer or computing-based elements, can be found with reference to FIG. 8, and can be used in connection with implementing one or more of the systems or components shown and described in connection with FIG. 2 or other figures disclosed herein.

System 200 can comprise diagnostic component 202. Diagnostic component 202 can be configured to determine an environment control (EC) system 204 has a fault condition. EC system 204 can be substantially similar to EC system 100 or can include all or portions of the elements detailed in connection with EC system 100 or other suitable elements. The fault condition detected by diagnostic component 202 is represented herein as fault 206, which can be any suitable failure or fault condition associated with any suitable element of EC system 204. As a representative example, fault 206 can be a failure or fault associated with HVAC equipment (e.g., HVAC equipment 106 of FIG. 1) such as a heat pump or other outdoor EC unit. EC system 204 can be configured to control certain conditions of environment 212. A representative example of a condition of environment 212 that can be controlled by EC system 204 is temperature, which can be controlled by conditioning (e.g., heating or chilling) air. Other examples can exist. For example, in addition to temperature noted above, humidity, pressure, luminosity, noise level and airflow or other suitable conditions of environment 212 might be controlled or affected by EC system 204.

System 200 can further comprise attention component 208 that can function to bring attention to fault 206. For example, attention component 208 can determine discomfort setting 210 for EC system 204 that, when effected in environment 212 controlled by EC system 204, is determined to cause discomfort to an occupant of environment 212. The occupant (e.g., occupant 112 of FIG. 1) can be an owner, landlord, superintendent, or tenant of at least some portions of environment 212 and/or a customer of the EC system 204 provider or a purchaser of EC system 204. Setting component 214 can be configured to instruct EC system 204 to maintain discomfort setting 210. In other words, a previous setting (e.g., set point) input to EC system 204 can be overridden with the discomfort setting in response to fault 206.

As used herein, any determination to cause "discomfort" is intended to refer to designated comfort levels that are input to EC system 204 or otherwise available, and specifically to operating EC system 204 in a manner that intentionally does not meet those designated comfort levels, and therefore is representative of a "discomfort level" setting as opposed to a "comfort level" setting.

As noted previously, a potentially problematic issues arises in other systems in which a failure or fault condition can occur without sufficient awareness of the fault condition. Such can be mitigated or remedied by creating one or more conditions within environment 212 that are readily perceptible by an occupant and/or that trigger or prompt an occupant to discover fault 206 that might otherwise remain undiscovered for a significant amount of time.

As a representative example used for the remainder of this disclosure, discomfort setting 210 can represent a temperature setting for an associated HVAC system. However, it is appreciated that discomfort setting 210 can relate to other conditions or quantities of environment 212. For instance, some embodiments of this disclosure detail updating a temperature set point of EC system 204 as a means of provoking an occupant to inspect a control interface (e.g., UI device 104) and thus learn of fault 206. It is appreciated that a similar result can be accomplished by modifying any suitable settings of the EC system 204 such as settings that control ambient temperature, luminance, or other quantities, depending on the capabilities of EC system 204. For example, lowering a temperature set point, causing an increased an HVAC flow noise level, or dimming lights, deemed mildly and temporarily outside a comfort level, can achieve a desired end of bringing awareness of fault 206. It is understood that the concept of intentionally changing an EC setting to prompt awareness of fault 206 can be employed to prompt awareness of other situations or events. For instance, in addition to bringing awareness of fault 206, a situation that causes the occupant to interact with UI device 104 can be utilized to bring awareness of various EC system 204 or utility actions or notices such as impending rate spikes, opportunities for credits or savings, a software or firmware update, and so forth.

Figure 3:
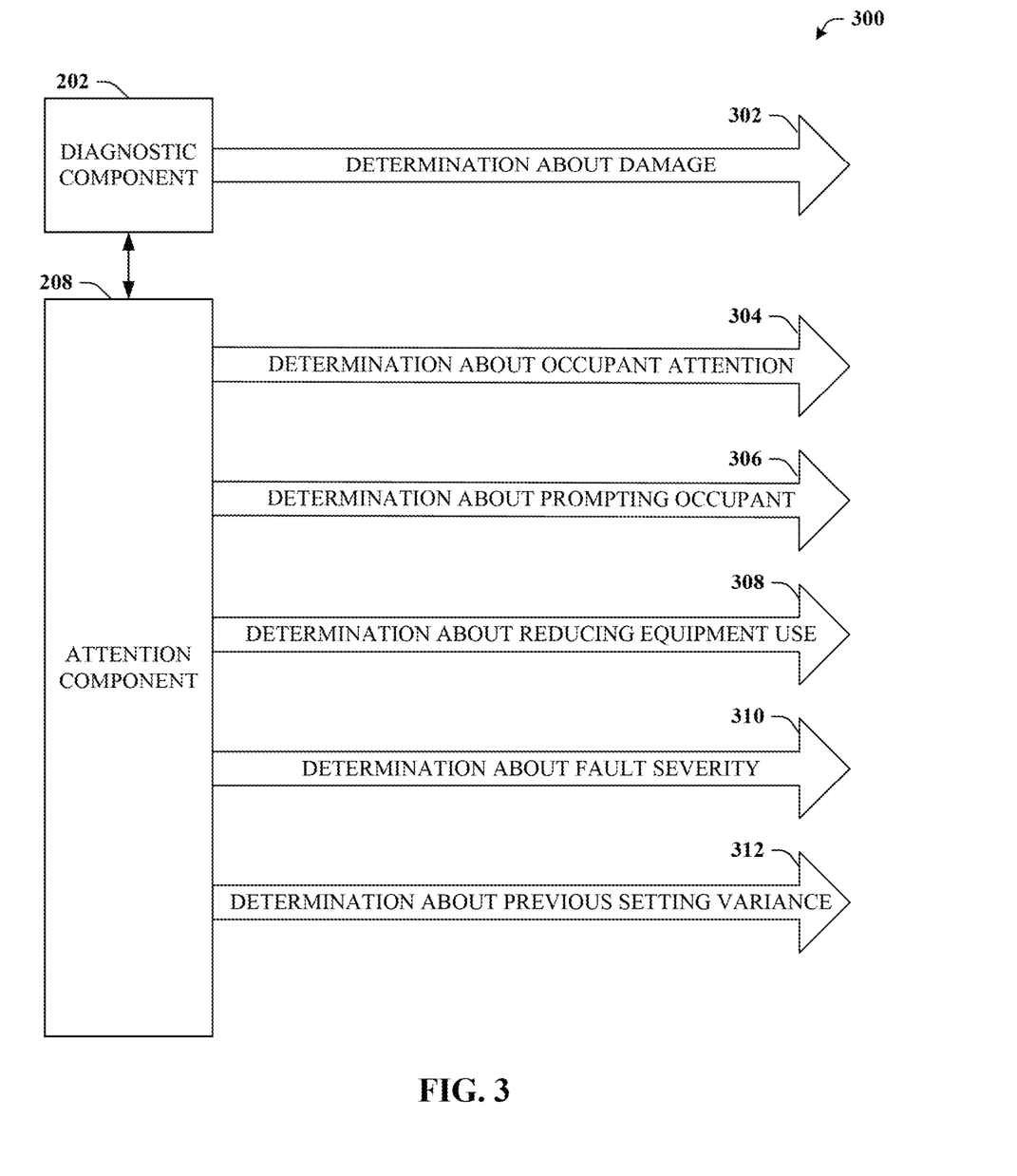
FIG. 3 illustrates a block diagram of an example system that can provide for or respond to various determinations regarding the fault or the discomfort setting in accordance with one or more embodiments of the disclosed subject matter.

Turning now to FIG. 3, a block diagram of system 300 is illustrated. System 300 can provide for or respond to various determinations regarding fault 206 or discomfort setting 210 in accordance with one or more embodiments of the disclosed subject matter. For example, as detailed in connection with FIG. 2, diagnostic component 202 can determine EC system has a fault condition. In some embodiments, said determination can be in response to a determination that continued operation of EC system 200 will likely cause damage to EC system 200, which is illustrated as determination 302. In other words, a trigger for subsequent actions such as implementing discomfort setting 210 can be further based on determinations about potential damage. It is understood that determination 302 can be performed by diagnostic component 202, or by a different component or system and relied upon by diagnostic component 202 to make other determinations such as triggering fault 206 in response to determination 302.

In addition, as was discussed at FIG. 2, attention component 208 can determine discomfort setting 210. In some embodiments, attention component 208 can determine discomfort setting 210 based on other information or determinations, which are illustrated as determinations 304-312. For example, attention component 208 might determine a value or type of discomfort setting 210 based on previous determinations exemplified by determinations 304-312. It is understood that determinations 304-312 can be performed by attention component 208 or by another system or component and then relied upon by attention component 208 to render subsequent determinations or refinements.

For instance, in some embodiments, attention component 208 can determine discomfort setting 210 based on a determination that a given discomfort setting 210 is likely to be readily apparent or noticeable to occupant 112. For example, determination 304 can be one in which it is determined that a condition in environment 212, resulting from discomfort setting 210 being applied to EC system 204, is likely to elicit the attention of occupant 112.

As another example, attention component 208 can determine discomfort setting 210 based on a determination (e.g., determination 306) that discomfort setting 210 will likely prompt occupant 112 to interact with a user interface (e.g., UI device 104). In some embodiments, setting component 214 can instruct UI device 104 to present an indication of fault 206, which is further detailed in connection with FIG. 4. Thus, a discomfort setting 210 that sets a temperature level of environment 212 outside a range expected by occupant 112 might be determined to be likely to prompt occupant 112 to examine a device displaying the error code or other indication of fault 206. Hence, discomfort setting 210 can be one that is determined to elicit notice of fault 206, which is a significant deficiency of other systems that (unintentionally) tend to mask such notice by virtue of maintaining normal conditions.

In some embodiments, attention component 208 can determine discomfort setting 210 based on a determination (e.g., determination 308) that discomfort setting 210 will likely reduce operational stresses of a component of the EC system that is subject to the fault condition. For example, a value selected for discomfort setting 210 can be selected to reduce operational stresses on certain equipment in addition to other factors such as eliciting attention, providing notice, and so forth.

In some embodiments, attention component 208 can determine discomfort setting 210 based on a determination (e.g., determination 310) about a severity of fault 206. For example, attention component 208 can determine discomfort setting 210 based on a determined level of severity of fault 206. For instance, if the severity of fault 206 is low, then a type (e.g., temperature setting, luminance setting, etc.), or a value (e.g., large or small difference from a comfort level) of discomfort setting 210 might differ from cases where the severity of fault 206 is high. In other words, a severity of fault 206 can be employed to add greater or lesser weight to other determinations such as a likelihood of successfully providing awareness or notice of fault 206.

In some embodiments, attention component 208 can determine discomfort setting 210 based on a determination (e.g., determination 312) about a variances from a previous setting. For example, attention component 208 can determine discomfort setting 210 based on a previously programmed setting which can be indicative of a comfort setting. Thus, a given variance from a comfort setting that is expected to meet the goals of awareness, notice, or others, can be determined, which is further detailed in connection with FIG. 4.

Figure 4:
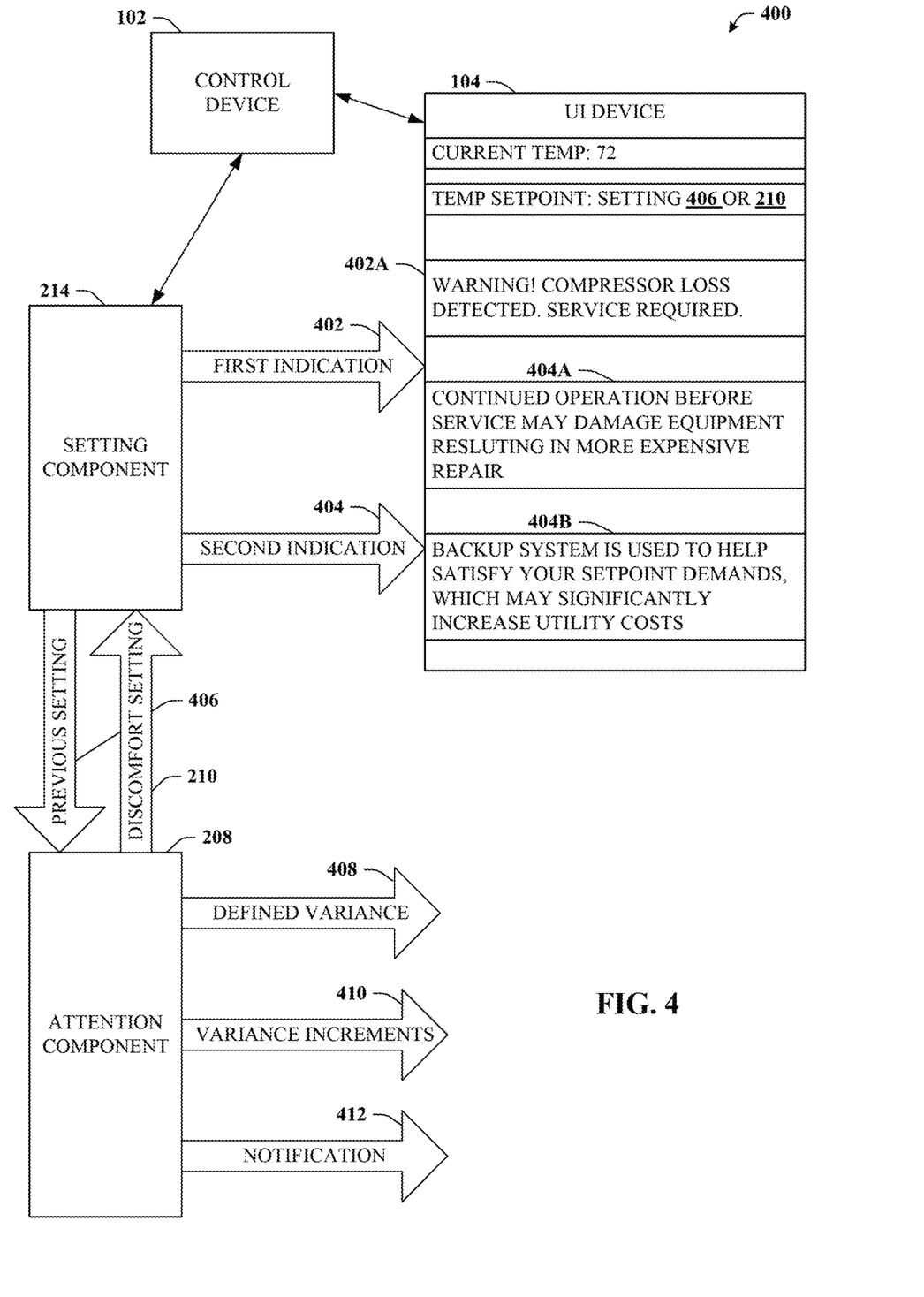
FIG. 4 illustrates a block diagram of an example system depicting additional aspects or elements in connection with improving awareness of a fault condition in accordance with one or more embodiments of the disclosed subject matter.

Referring now to FIG. 4, a block diagram of system 400 is depicted. System 400 illustrates additional aspects or elements in connection with improving awareness of a fault condition in accordance with one or more embodiments of the disclosed subject matter. System 400 can include all or a portion of systems 100 and 200 of FIGS. 1 and 2 or other suitable components or elements.

For example, system 400 can comprise control device 102 and UI device 104 as detailed in connection with system 100. In addition, system 400 can comprise attention component 208 and setting component 214 as detailed in connection with system 200. In the illustrated embodiment, setting component 214 can acquire previous setting 406 from control device 102. Previous setting 406 (e.g., a temperature setting input by occupant 112) can be provided to attention component 208 and can be inferred to represent a comfort level or level of expectation for occupant 112.

Based on previous setting 406, attention component 208 can determine discomfort setting 210, which can be provided to setting component 214. Setting component 214 can subsequently update control device 102 according to discomfort setting 210, which can be accomplished in a variety of ways, which can be discussed in connection with UI device 104.

As illustrated, UI device 104 can present a current temperature (e.g., 72 degrees) as well as a current temperature set point. The current temperature set point can reflect either previous setting 406 or discomfort setting 210, depending on the implementation or design. In other words, in some embodiments, setting component 214 can operate to outwardly update the current temperature set point from previous setting 406 to discomfort setting 210. In other embodiments, setting component 214 can internally instruct control device 102 independently of data represented by UI device 204. In some embodiments, UI device 204 can present both previous setting 406 and discomfort setting 210.

As previously detailed, setting component 214 can be configured to instruct UI device 104 to present an indication of fault 206, which is illustrated here as first indication 402. First indication 402, when presented by UI device 104 may take the form of an error code or a brief description of fault 206, which is illustrated by indication 402A. Additionally, or alternatively, setting component 214 can be configured to instruct UI device 104 to present second indication 404.

Second indication 404 can represent potential consequences of continued operation to EC system 100 without service to address fault 206. Indications 404A and 404B are representative examples, but other suitable indications or error codes might also be employed.

As has been discussed, attention component 208 can determine discomfort setting based on previous setting 406. In some embodiments, attention component 208 can select discomfort setting 210 based on defined variance 408. Defined variance 408 can represent a variance from previous setting 406. For example, defined variance 408 can be a variance that is determined to trigger occupant 112 to notice the condition of environment 212 caused by discomfort setting 210 and/or determined to prompt occupant 112 to inspect UI device 104.

Furthermore, in some embodiments, attention component 208 can determine variance increments 410. Variance increments 410 can be determined amounts by which to change previous setting 406 (or a previously input discomfort setting 210 that failed to trigger awareness or notice). In some embodiments, the size of variance increments 410 can be determined according to any suitable function, including a linear function, exponential function, and so on. Variance increments 410 can be determined to trigger occupant 112 to notice the condition of environment 212 caused by discomfort setting 210 and/or determined to prompt occupant 112 to inspect UI device 104.

In some embodiments, attention component 208 can update defined variance 408 (and, by proxy, discomfort setting 210) over time. For instance, defined variance 408 can be gradually increased, by variance increment 410, continually until it can be determined by some suitable form of feedback that occupant 112 is aware of or has notice of fault 206. In some embodiments, such can be determined to cause increasing levels of discomfort over time. Likewise, the increasing levels of discomfort over time can be determined to be increasingly more likely to cause occupant 112 to inspect UI device 104 and be alerted of fault 206.

In some embodiments, attention component 208 can determine notification 412. Notification 412 can represent information about fault 206 and/or EC system 204 that, depending on the capabilities of the system, can be provided to an external system. For instance, notification 412 can take the form of an email, text, or other communication that can be sent to occupant 112, service technician 114 or another suitable party. Notification 112 may, for example, include information similar to first indication 402 or second information 404 as well as other suitable information. Where feasible, providing such information to occupant 112 via email or the like can reinforce indications 402 or 404 provided to UI device 104 and can further the object of awareness. Furthermore, notification 412 might be delivered to an HVAC dealer or other party, e.g., inviting service technician 114 to contact occupant 112 to provide guidance or ensure occupant 112 is aware of the fault 206 or other issue relating to EC system 204.

Figure 5A:
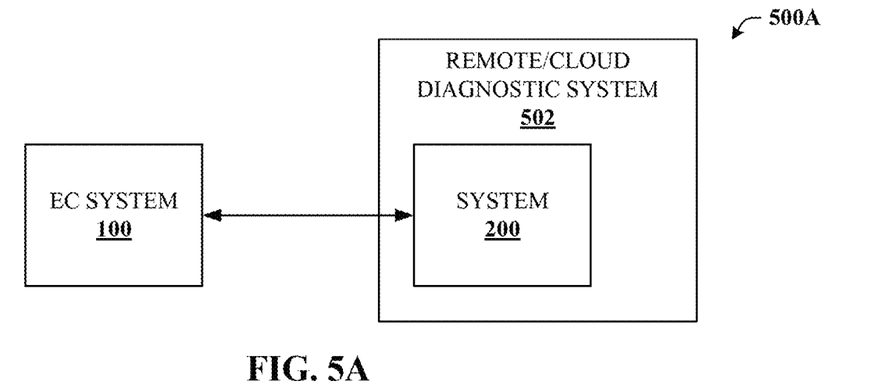
FIGS. 5A-C illustrate block diagrams of example architectural implementations that can be employed in accordance with one or more embodiments of the disclosed subject matter.
Figure 5B:
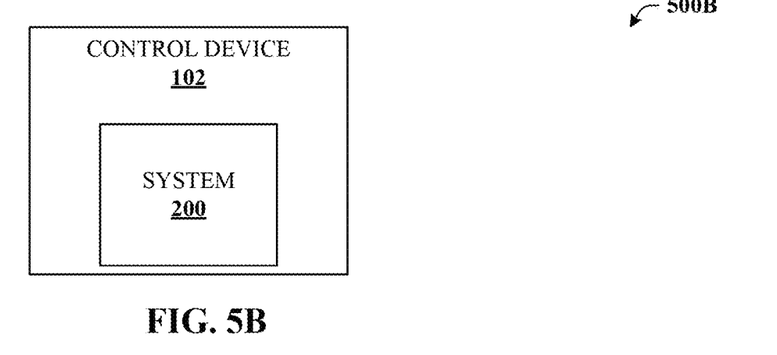
Figure 5C:
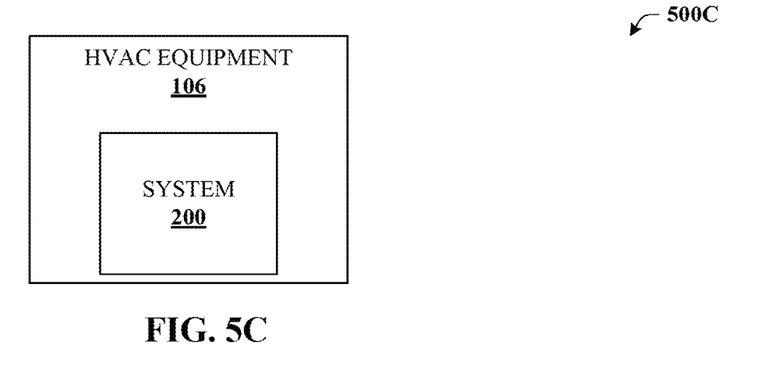

Turning now to FIGS. 5A-C, various block diagrams 500A-C of example architectural implementations are illustrated in accordance with one or more embodiments of the disclosed subject matter.

For example, block diagram 500A depicts an example architectural design in which all or portions of system 200 (or other components detailed herein) are remote from EC system 100 and located in a remote or cloud diagnostic system 502. Such can be contrasted with architectures depicted in FIGS. 5B and 5C in which system 200 can be a component of EC system 100.

For instance, block diagram 500B depicts an example architectural design in which all or portions of system 200 (or other components detailed herein) are included in control device 102 of EC system 100. As noted, control device 102 can be a thermostat or other suitable device and is typically coupled to a user interface that is accessible to occupant 112.

Block diagram 500C depicts an example architectural design in which all or portions of system 200 (or other components detailed herein) are included in HVAC equipment 106 of EC system 100.

Example Methods

Figure 6:
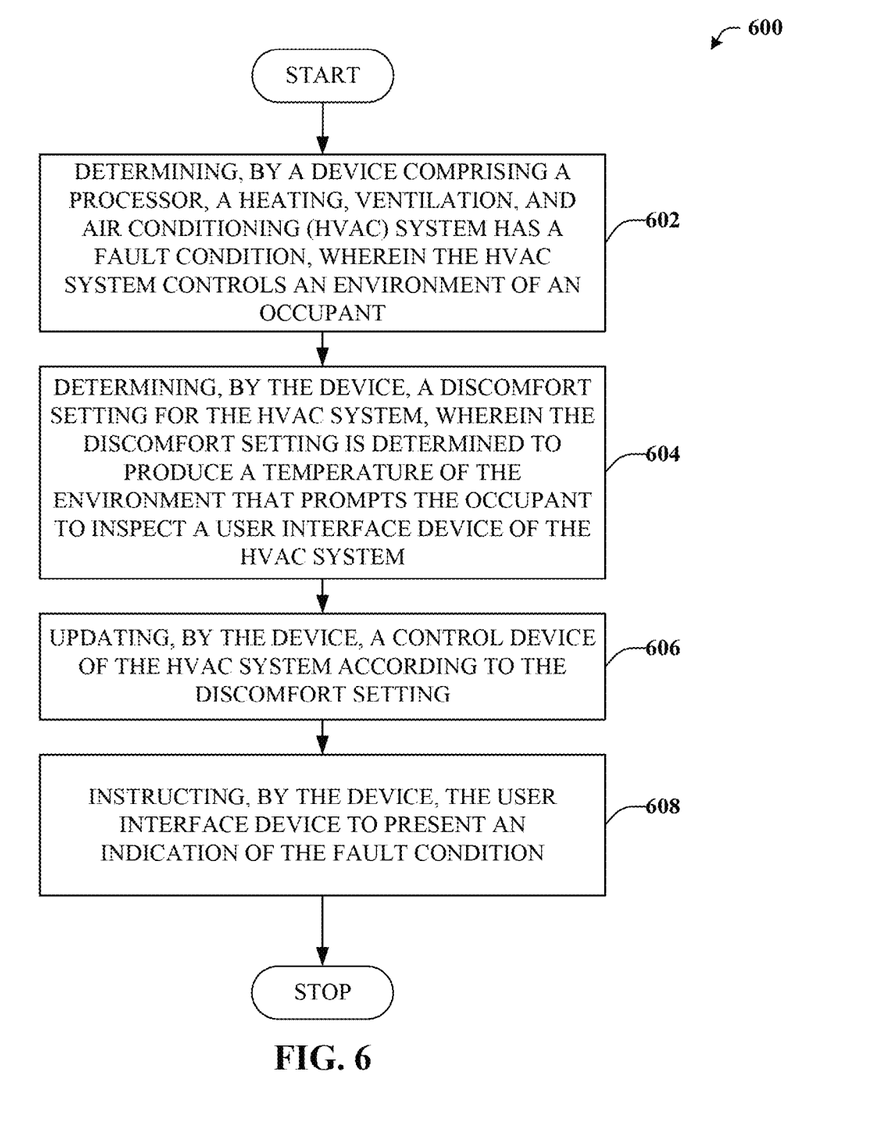
FIG. 6 illustrates a flow diagram of an example, non-limiting computer-implemented method that can improve awareness of a fault condition in accordance with one or more embodiments of the disclosed subject matter.
Figure 7:
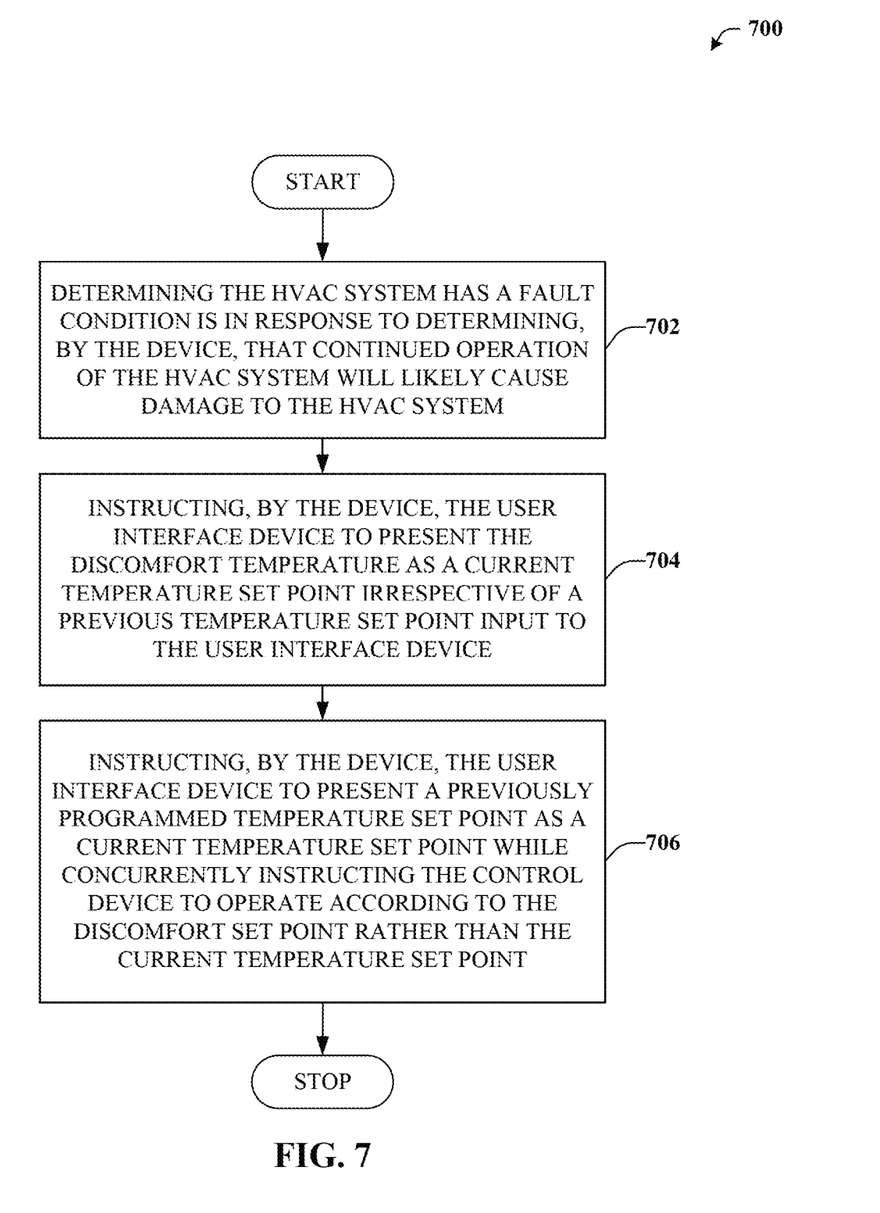
FIG. 7 illustrates a flow diagram of an example, non-limiting computer-implemented method that can provide for additional aspects or elements in connection with improving awareness of a fault condition in accordance with one or more embodiments of the disclosed subject matter.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 6 illustrates a flow diagram 600 of an example, non-limiting computer-implemented method that can improve awareness of a fault condition in accordance with one or more embodiments of the disclosed subject matter. For example, at reference numeral 602, a device (e.g., system 200) operatively coupled to a processor can determine a heating, ventilation, and air conditioning (HVAC) system has a fault condition. The HVAC system can be configured to control an environment of an occupant.

At reference numeral 604, the device can determine a discomfort setting for the HVAC system. The discomfort setting can be determined to produce a temperature of the environment that is determined to prompt the occupant to inspect a user interface device of the HVAC system.

At reference numeral 606, the device can update a control device of the HVAC system according to the discomfort setting. In other words, instead of attempting to operate the HVAC system in a manner consistent with a comfort setting or expectation of the occupant, the HVAC system can be operated in a manner that is not consistent with a comfort setting or expectation of the occupant. Such can be a trigger or impetus for what was determined to prompt the occupant to inspect the user interface.

At reference numeral 608, the device can instruct the user interface device to present an indication of the fault condition. By presenting indication of the fault condition on the user interface device and generating a condition (e.g., environment temperature outside of expectations) that is determined to prompt the occupant to inspect the user interface device, awareness or notice of the fault condition on the part of the occupant can be improved.

Turning now to FIG. 7, illustrated is a flow diagram 700 of an example, non-limiting computer-implemented method that can provide for additional aspects or elements in connection with improving awareness of a fault condition in accordance with one or more embodiments of the disclosed subject matter. For example, at reference numeral 702, the determining the HVAC system has a fault condition (e.g., performed at reference numeral 602 of FIG. 6) can comprise determining, by the device, that continued operation of the HVAC system will likely cause damage to the HVAC system. In other words, a fault condition that not determined to be likely to cause damage to the HVAC system might be detected but might not trigger discomfort setting elements.

At reference numeral 704, the device can instruct the user interface device to present the discomfort setting as a current temperature set point irrespective of a previous temperature set point input to the user interface device.

At reference numeral 706, the device can instruct the user interface device to present a previously programmed temperature set point as a current temperature set point while concurrently instructing the control device to operate according to the discomfort set point rather than the current temperature set point.

Example Operating Environments

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 8, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 8:
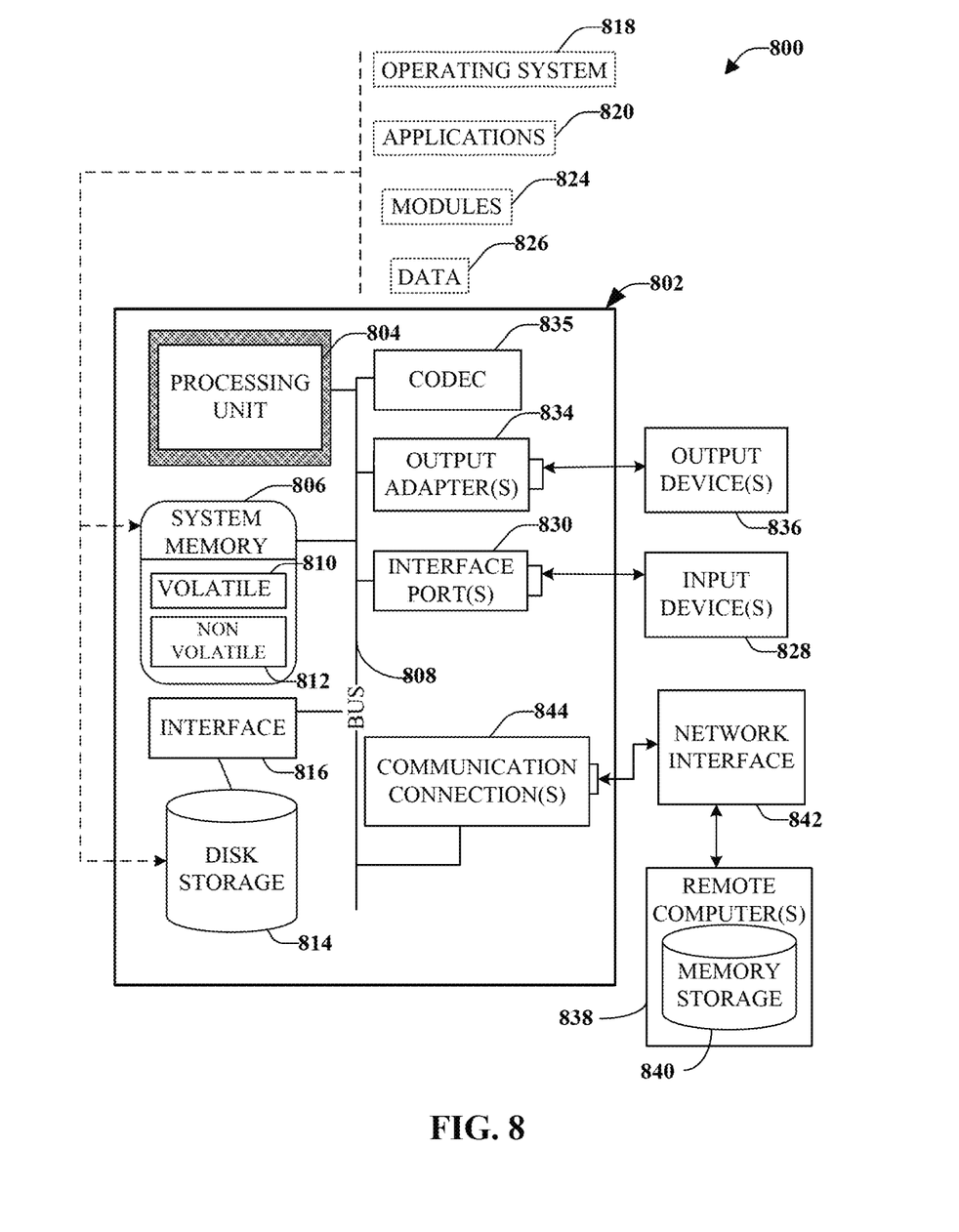
FIG. 8 illustrates a block diagram of an example, non-limiting operating environment in which one or more embodiments described herein can be facilitated.

With reference to FIG. 8, an example environment 800 for implementing various aspects of the claimed subject matter includes a computer 802. The computer 802 includes a processing unit 804, a system memory 806, a codec 835, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 806 includes volatile memory 810 and non-volatile memory 812, which can employ one or more of the disclosed memory architectures, in various embodiments. The basic input/output system (BIOS), containing the basic routines to transfer information between elements within the computer 802, such as during start-up, is stored in non-volatile memory 812. In addition, according to present innovations, codec 835 can include at least one of an encoder or decoder, wherein the at least one of an encoder or decoder can consist of hardware, software, or a combination of hardware and software. Although, codec 835 is depicted as a separate component, codec 835 can be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 812 can employ one or more of the disclosed memory devices, in at least some embodiments. Moreover, non-volatile memory 812 can be computer memory (e.g., physically integrated with computer 802 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 810 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 802 can also include removable/non-removable, volatile/non-volatile computer storage medium. FIG. 8 illustrates, for example, disk storage 814. Disk storage 814 includes, but is not limited to, devices like a magnetic disk drive, solid state disk (SSD), flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816. It is appreciated that storage devices 814 can store information related to a user. Such information might be stored at or provided to a server or to an application running on a user device. In one embodiment, the user can be notified (e.g., by way of output device(s) 836) of the types of information that are stored to disk storage 814 or transmitted to the server or application. The user can be provided the opportunity to opt-in or opt-out of having such information collected or shared with the server or application (e.g., by way of input from input device(s) 828).

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port can be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor-based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A heating, ventilation, and air conditioning (HVAC) system comprising:
   HVAC equipment; and
   a control device including a processor configured to execute computer executable components to cause the control device to at least:
      detect a fault condition of the HVAC equipment, wherein the HVAC equipment is able to maintain a user defined comfort temperature set point with the fault condition; and automatically as a direct result thereof,
      adjust operation of the HVAC equipment to achieve a discomfort setting of the HVAC equipment that is different from a previous comfort setting, in order to drive occupant awareness of the fault condition, wherein the previous comfort setting is the user defined temperature set point, and the operation adjustment includes changing the user defined temperature set point to a discomfort temperature set point, wherein the discomfort temperature set point is outside of a set point range expected by the occupant.

2. The HVAC system of claim 1, wherein the HVAC system further comprises a user interface configured to present an indication of the fault condition.

3. The HVAC system of claim 2, wherein the user interface is further configured to present an indication of potential consequences of continued operation of the HVAC equipment without service to address the fault condition.

4. The HVAC system of claim 1, wherein the control device is caused to detect the fault condition in response to a determination that continued operation of the HVAC equipment will likely cause damage to the HVAC equipment.

5. The HVAC system of claim 1, wherein the processor is configured to execute the computer executable components to cause the control device to further determine the discomfort setting based on a determination that the discomfort setting will reduce operational stress of a component of the HVAC equipment that is subject to the fault condition.

6. The HVAC system of claim 1, wherein the processor is configured to execute the computer executable components to cause the control device to further determine the discomfort setting based on a determined level of severity of the fault condition, or a defined variance from the previous comfort setting.

7. The HVAC system of claim 6, wherein the control device is caused to determine the discomfort setting based on the defined variance from the previous comfort setting, and the defined variance is updated in increments as a function of time, resulting in the discomfort setting determined to cause increasing levels of discomfort over time.

8. A control device for a heating, ventilation, and air conditioning (HVAC) system that includes HVAC equipment, the control device comprising:
   a memory configured to store computer executable components;
   a processor configured to access the memory, and execute the computer executable components to cause the control device to at least:
      detect a fault condition of the HVAC equipment, wherein the HVAC equipment is able to maintain a user defined comfort temperature set point with the fault condition; and automatically as a direct result thereof,
      determine a discomfort setting of the HVAC equipment that, when effected in an environment controlled by the HVAC system, is determined to cause discomfort to an occupant of the environment; and
      adjust operation of the HVAC equipment to achieve the discomfort setting, in order to drive occupant awareness of the fault condition, wherein the previous comfort setting is the user defined temperature set point, and the operation adjustment includes changing the user defined temperature set point to a discomfort temperature set point, wherein the discomfort setting adjusts the temperature set point to be outside of a range expected by the occupant.

9. The control device of claim 8, wherein the processor is configured to execute the computer executable components to cause the control device to further instruct a user interface to present an indication of the fault condition.

10. The control device of claim 9,
wherein the control device is caused to instruct the user interface to further present an indication of potential consequences of continued operation of the HVAC equipment without service to address the fault condition.

11. The control device of claim 8, wherein the control device is caused to detect the fault condition in response to a determination that continued operation of the HVAC equipment will likely cause damage to the HVAC equipment.

12. The control device of claim 8, wherein the control device is caused to determine the discomfort setting based on a determination that the discomfort setting will reduce operational stress of a component of the HVAC equipment that is subject to the fault condition.

13. The control device of claim 8, wherein the control device is caused to determine the discomfort setting based on a determined level of severity of the fault condition, or a defined variance from the previous comfort setting.

14. The control device of claim 13, wherein the control device is caused to determine the discomfort setting based on the defined variance from the previous comfort setting, and the defined variance is updated in increments as a function of time, resulting in the discomfort setting determined to cause increasing levels of discomfort over time.

15. A method of operating a heating, ventilation, and air conditioning (HVAC) system that includes HVAC equipment and a control device, the method comprising the control device:

detecting a fault condition of the HVAC equipment, wherein the HVAC equipment is able to maintain a user defined comfort temperature set point with the fault condition; and automatically as a direct result thereof, adjusting operation of the HVAC equipment to achieve a discomfort setting of the HVAC equipment that is different from a previous comfort setting, in order to drive occupant awareness of the fault condition, wherein the previous comfort setting is the user defined temperature set point, and the operation adjustment includes changing the user defined temperature set point, wherein the discomfort setting adjusts the temperature set point to be outside of a range expected by the occupant.

16. The method of claim 15, wherein the method further comprises a user interface presenting an indication of the fault condition.

17. The method of claim 15,
wherein the method further comprises the user interface further presenting an indication of potential consequences of continued operation of the HVAC equipment without service to address the fault condition.

18. The method of claim 15, wherein the fault condition is detected in response to a determination that continued operation of the HVAC equipment will likely cause damage to the HVAC equipment.

19. The method of claim 15, wherein the method further comprises determining the discomfort setting based on a determination that the discomfort setting will reduce operational stress of a component of the HVAC equipment that is subject to the fault condition.

20. The method of claim 15, wherein the method further comprises determining the discomfort setting based on a determined level of severity of the fault condition, or a defined variance from the previous comfort setting.

* * * * *